Figure 1:
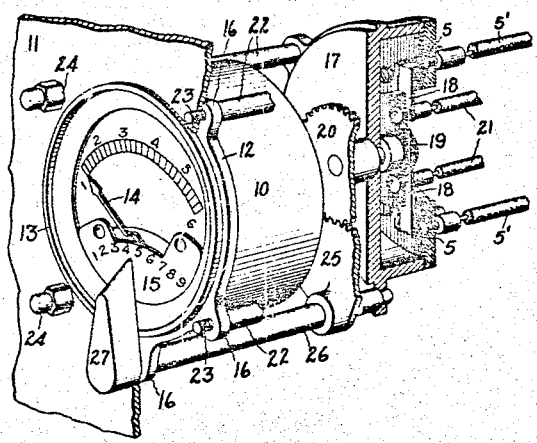

Nov. 20, 1934.  E. G. HAVEN  1,981,548

COMBINED ELECTRICAL INDICATING INSTRUMENT AND SELECTOR SWITCH

Filed Nov. 30, 1931

Inventor:
Edward G. Haven,
by Charles E. Tulla
His Attorney.

Patented Nov. 20, 1934

1,981,548

UNITED STATES PATENT OFFICE 1,981,548

COMBINED ELECTRICAL INDICATING INSTRUMENT AND SELECTOR SWITCH

Edward G. Haven, Scotia, N. Y., assignor to General Electric Company, a corporation of New York Application November 30, 1931, Serial No. 578,014

2 Claims. (Cl. 177—311)

My invention relates to a combined electrical indicating instrument and selector switch. The principal object of my invention is to provide an arrangement of the above indicated character that is light, compact, requires a minimum of space, and that possesses other advantageous features of construction and operation which will be specifically pointed out during the course of this specification. My combined indicating instrument and selector switch is especially advantageous when installed on an aeroplane instrument panel and employed for reading successively the temperatures of different parts of the aeroplane engine on a single indicating instrument, and, therefore, I prefer to describe my invention in connection with such use.

It is well known that the average aeroplane has an instrument panel on which are mounted from 25 to 30 instruments for indicating various important climatic conditions, flying conditions, and operating conditions of the aeroplane engines. It is considered essential to the safe and successful flying of an aeroplane during all kinds of weather, that the pilot have throughout the flight instantaneous and accurate indications of all the conditions that these instruments are designed to indicate, in order that the pilot may immediately notice any change in a condition that imports danger, and, therefore, know what steps to take to avert this impending danger.

One of the very important conditions that should be indicated is the temperatures of some of the aeroplane engine parts, as, for example, some of the cylinder heads, cylinder walls, and any "hot spots" on the engine that may be of particular significance. The reason for this is, that too rapid heating of the engine may occur due to a defect in the engine or in its cooling system; or too rapid cooling of the engine may occur during a long glide in cold weather before landing; and either condition may cause failure of the engine to function when power is suddenly needed, thereby placing the aeroplane and its occupants in grave danger. If, however, the engine temperature is indicated, the pilot can take suitable steps in time to prevent too high or too low engine temperatures, and thus avoid danger from this source. Furthermore, by avoiding too high engine temperatures, the engine maintenance charges and standby losses incident thereto are greatly reduced. Most aeroplanes, therefore, are provided with a plurality of thermocouple circuits associated with various parts of the engine, and a selector switch for connecting any desired thermocouple circuit to an electrical indicating instrument having a scale calibrated in degrees temperature.

It is conducive to the safe flying of aeroplanes to reduce the mental and physical strain on the pilot due to the continual observation of the numerous indicating instruments. To further this end, the instruments are closely grouped on the panel, and the most important instruments are placed adjacent to each other to reduce as much as possible the shifting of the pilot's eyes in observing their indications. One of the most important indications is the engine temperature, and, obviously, it would be desirable to place the selector switch and temperature indicating instrument adjacent to each other because of two reasons: first, it would reduce the shifting of the pilot's eyes from the instrument to the selector switch, and vice-versa, when manipulating the switch to determine the temperatures of the various engine parts, thus reducing the strain on the pilot and also facilitating the rapid measuring of the temperatures, and, second, it would either increase the accuracy of the temperature indications or eliminate a possible breaking of the leads between the switch and instrument, as more clearly described later. However, in most cases it is considered more important to place the selector switch quite distant from the temperature indicating instrument in order to place all important instruments as closely together as possible, because the advantages of the latter arrangement are believed to outweigh the disadvantages resulting from placing the selector switch remote from the temperature indicating instrument.

It therefore became desirable to provide an arrangement in which the selector switch is adjacent to the temperature indicating instrument without occupying any panel space. This desirable arrangement is provided by my invention, which, briefly described, consists of an indicating instrument and selector switch that are so constructed and combined that both are supported in a depending manner from the instrument panel with the scale plates of both visible from the front of the panel while the switch contact members are behind the rear side of the panel adjacent to the instrument, and with the selector switch handle on the front side of the panel to operate the selector switch contacts and to cooperate with the scale plate of the switch for indicating the engine part whose temperature is being measured by the instrument, the various parts being so constructed, combined, and arranged that they occupy no more panel space than that occupied by the indicating instrument alone.

My invention, however, will be best understood from the following description when considered in connection with the accompanying drawing, while the features of my invention which are believed to be novel and patentable are set forth in the appended claims.

Figure 2:
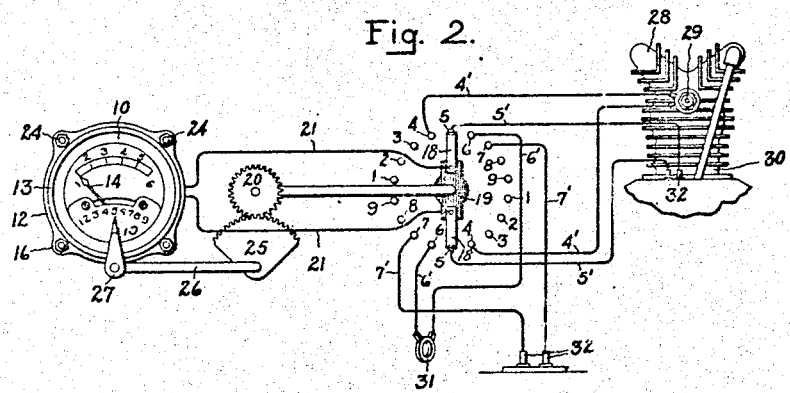

Fig. 1 of the drawing represents a perspective view of a preferred embodiment of my combined indicating instrument and selector switch mounted on an instrument panel, the panel and switch being partially cut away to improve the view. Fig. 2 of the drawing represents a diagrammatic view of my combined indicating instrument and selector switch connected to a plurality of thermocouple circuits, two of these circuits being illustrated in connection with the measurement of temperature on one of the cylinders of an aeroplane engine. Similar reference characters designate corresponding parts in both figures of the drawing.

Referring to Fig. 1, 10 represents an electrical indicating instrument, as for example a millivoltmeter, and 11 represents an instrument panel. The instrument 10 has a flanged front end portion consisting of a flange 12 and a circular rim 13. Extending from the front side to the rear side of panel 11 is a relatively large circular opening, into which rim 13 snugly fits, with flange 12 abutting the rear side of the panel. The front end of the instrument has an indicating needle 14 cooperating with a scale calibrated in degrees temperature. This scale may be marked in any desired manner, as for example, the numbers 1, 2, 3, etc., on the scale may respectively represent 100° F., 200° F., 300° F., etc. The instrument has the usual glass window at its front end to make the indicating needle 14 visible and the instrument dust-proof, and on either side of this window there is secured to the front end of the instrument a scale plate 15 having a series of spaced apart different figures, as for example 1, 2, 3, etc. The flange 12 has five ears 16, each ear having a hole, these holes being respectively in substantial alignment with five relatively small holes in panel 11. Only three of the ears and only the small hole in the panel near the upper right hand ear are shown in order not to obscure other parts of the figure.

A casing 17 has secured thereto nine circumferentially disposed spaced apart pairs of stationary contacts numbered 1 and 1, 2 and 2, etc. Only the pair of contacts 5 and 5 are clearly shown in Fig. 1, but all nine pairs are shown in Fig. 2. In side casing 17 there are two contact members 18 secured to an insulation plate 19. Plate 19 is rotatably mounted in the casing and is adapted to be rotated by a gear 20. The contact members 18 are insulated from each other and from the casing, and are adapted in different positions to make contact with different pairs of stationary contact members. Leads 21 are connected to the movable contact members 18, and, as can be seen from Fig. 2, these leads are connected to the instrument 10. Both instrument and casing are supported from the panel by the same four rods 22, only three of which are partly visible in Fig. 1. Each rod has a flanged threaded end portion 23 passing through a hole in an ear 16 and the correspondingly aligned hole in panel 11. Nuts 24 are screwed over the threaded ends 23 protruding through the panel, and it is therefore clear that the latter and flange 12 of the instrument are rigidly clamped against the shoulder of each rod at its flanged end portion. Casing 17 is secured to the opposite ends of rods 22 so that the latter are substantially parallel to each other, and it is obvious that instrument 10 and casing 17 are supported in a depending manner from panel 11, with the front end of the instrument and scale plate 15 visible from the front side of the panel and with the casing behind the rear side of the panel. Although I prefer to illustrate my invention in connection with a panel having a hole through which the front end of the instrument is visible, yet, I wish it clearly understood that my invention is not limited to this construction, since it is obvious that the panel hole may be covered by a window of glass or other transparent material, or the panel itself may be made of transparent material without having a hole. Gear 20, and hence contact members 18, are rotated by a toothed sector 25 in mesh with gear 20. Sector 25 is secured to a rod 26 that is rotatably mounted in the casing and in the lower ear 16 of flange 12. One end of rod 26 protrudes through the panel, and to this end is secured a combined indicating pointer and handle 27 whose pointed end is adjacent to and underneath the figures on scale plate 15. The two contact members 18 are displaced from each other by the same angle as that between a pair of stationary contacts connected to any thermocouple circuit. For example, in Fig. 1 a thermocouple circuit is connected by leads 5' to the pair of contacts 5, 5, and since the latter are preferably placed diametrically opposite each other, therefore, contact members 18 are also secured to the insulation plate diametrically opposite each other. The spacing between the figures on scale plate 15, and the relative positions of pointer 27 and contact members 18, are so selected that pointer 27 not only moves contact members 18 but also cooperates with the figures on the scale plate to indicate which pair of stationary contacts are connected to instrument 10 through movable contact members 18. It is preferable, though not essential, to thread the holes in the ears 16, through which rods 22 pass, so that the threaded ends of the latter may be screwed into these threaded holes, thus combining the instrument and switch into a unitary structure prior to mounting on the panel and thereby facilitating this mounting operation.

Referring to Fig. 2, 28 represents a cylinder head having a spark plug 29, and 30 represents part of the cylinder wall, of one of the cylinders of an aeroplane engine. Only four out of the nine thermocouple circuits ordinarily used for measuring the temperatures of various engine parts are shown. These four thermocouple circuits are 4', 4'; 5', 5'; 6', 6'; and 7', 7', and they are respectively connected to the pairs of stationary contact members 4 and 4, 5 and 5, 6 and 6, 7 and 7, as shown. The remaining thermocouple circuits will be similarly connected to the remaining stationary contact members. Any suitable type of thermocouple circuit may be employed, those illustrated consisting of an iron wire and a wire made of a nickel-copper alloy known as Constantan. Two ends of the wires of each thermocouple circuit are connected to a pair of stationary contact members of the selector switch. The remaining two ends of the two wires of each thermocouple circuit are connected to the part whose temperature is to be indicated, two types of connection being shown. One type consists of a copper washer 31, as shown in thermocouple circuits 4', 4' and 6', 6', the washer 31 in circuit 4', 4' being underneath spark plug 29, thus serving as a gasket for the latter and also serving as a thermocouple for the cylinder head. The other type of connection consists of a pair of studs 32 driven into the part whose temperature is to be indicated, as shown in thermocouple circuits 5', 5' and 7', 7'. As shown in Fig. 2, the instrument is connected to thermocouple circuit 5', 5' and is therefore connected to indicate the temperature of cylinder wall 30, the pointer 27 pointing to 5 on scale plate 15. It is clear that by moving pointer 27, any thermocouple circuit may be connected to the instrument and the pointer will show which circuit is connected to the instrument.

The thermocouples are usually placed in those parts of the aeroplane engine that are likely to develop "hot spots". With my combined indicating instrument and selector switch, the indicating pointer and scale plate of the selector switch are so close to the indicating needle and scale plate of the instrument that there is practically no shifting of the pilot's eyes when measuring one temperature after another, thus greatly reducing the strain on the pilot and also facilitating the rapid measuring of the temperatures. These results, highly valuable in themselves, are, however, also very effective in prompting the pilot to check the temperatures more often than with prior art devices which require more time and cause strain. It follows that the pilot will be able more readily to avoid too rapid heating or cooling of the aeroplane engine, and thus not only avoid possible damage to the latter, but also avoid a possible catastrophe to the aeroplane and its occupants. In addition, my combined indicating instrument and selector switch occupy no more instrument panel than that occupied by the instrument alone, thus reducing the size and hence the weight of the panel. Also, the instrument and switch may be assembled as a unitary structure prior to mounting on the panel, thus facilitating this mounting operation.

Furthermore, it is desirable that the instrument 10 be self-compensating for changes in air temperature, so that it will be unnecessary for the pilot to make corrections therefor. A self-compensating instrument is illustrated and described in United States Patent No. 1,857,196, granted May 10, 1932, to Kinnard and Faus, assigned to the assignee of this application. In order to have the entire indicating apparatus self-compensating for changes in air temperature, it is necessary, when the selector switch is not adjacent to the instrument, to have leads 21 connecting the switch and instrument of the same metals as the thermocouple leads. From examination of Figs. 1 and 2, it is evident that the ends of leads 21 connected to contact members 18 will be twisted and untwisted as these contact members are rotated back and forth to check the temperature of the various engine parts. This twisting and untwisting may easily break leads 21 when they are of the same metals as the thermocouple leads, because these metals are brittle, thus causing failure of the instrument to indicate the temperature. If this disadvantage is overcome by making leads 21 out of some ductile or pliant metal, such as annealed copper, then it is highly possible, when the switch is not adjacent to the instrument, that the air temperature at the ends of leads 21 connected to contact members 18 will be different than the air temperature at the instrument 10. This will introduce the disadvantage of erroneous indications on the instrument, since the latter is self-compensating for changes in air temperature only when the cold junctions of the thermocouples are adjacent to the instrument, that is, when the cold junctions and instrument are affected by the same air temperature. However, with the arrangement described the cold junctions are remote from the instrument, and, therefore, the cold junctions and instruments may be affected by different air temperatures. My combined indicating instrument and selector switch provides an arrangement having neither of the above mentioned disadvantages, because in my arrangement the leads may be of any ductile or pliant metal, and since the cold junctions of the thermocouples are adjacent to the instrument, therefore, the entire indicating apparatus is self-compensating for changes in air temperature.

My combined indicating instrument and selector switch has been installed and used in aeroplanes, and has given very satisfactory operation in actual practice. Furthermore, it has been favorably received and commented upon by members of the flying profession because of its above described advantageous features over prior art devices.

At present, I regard the measurement of aeroplane engine temperatures as the most important practical application of my invention, and have, therefore, described my invention in connection with such use. However, I wish it clearly understood that my invention in its broader aspects is not restricted to this use, whether installed in aeroplanes or elsewhere. Accordingly, I do not wish to be limited to the exact arrangement herein shown and described, but seek to cover in the appended claims all those modifications which come within the true scope and spirit of my invention.

What I claim as new and desire to secure by Letters Patent of the United States, is:

1. In combination, an instrument panel, an electrical measuring instrument supported by said panel, said instrument being self-compensating for changes in ambient air temperature, a switch having cooperating stationary and movable contact members, said switch being supported by said panel in a position adjacent said instrument whereby the latter and the switch are subjected to the same ambient air temperature, a plurality of responsive means connected to the stationary contact members, at least one of said responsive means being a thermocouple, flexible ductile leads connecting the movable contact members to said instrument, said leads being suspended in space where they are subjected to substantially the same ambient air temperature as that to which said instrument and switch are subjected, and means operable from the front of said panel for operating said movable contact members.

2. In combination, an instrument panel, an electrical measuring instrument supported by said panel, said instrument being self-compensating for changes in ambient air temperature, a switch having a movable contact member cooperating with a plurality of stationary contacts, said switch being supported by said panel in a position adjacent said instrument whereby the latter and the switch are subjected to the same ambient air temperature, a plurality of thermocouple circuits connected to the stationary contacts, flexible ductile leads connecting the movable contact member to said instrument, said leads being suspended in space where they are subjected to substantially the same ambient air temperature as that to which said instrument and switch are subjected, and means operable from the front of said panel for operating said movable contact members.

EDWARD G. HAVEN.